US008855700B2

(12) United States Patent
Blomgren et al.

(10) Patent No.: US 8,855,700 B2
(45) Date of Patent: Oct. 7, 2014

(54) UPLINK POWER CONTROL

(75) Inventors: Mats Blomgren, Stockholm (SE); Johan Hultell, Solna (SE); Klas Johansson, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 528 days.

(21) Appl. No.: 13/266,007

(22) PCT Filed: Sep. 28, 2011

(86) PCT No.: PCT/SE2011/051156
§ 371 (c)(1), (2), (4) Date: Oct. 24, 2011

(87) PCT Pub. No.: WO2012/050506
PCT Pub. Date: Apr. 19, 2012

(65) Prior Publication Data
US 2012/0157152 A1 Jun. 21, 2012

Related U.S. Application Data

(60) Provisional application No. 61/392,088, filed on Oct. 12, 2010.

(51) Int. Cl.
| | |
|---|---|
| H04B 7/00 | (2006.01) |
| H04W 52/14 | (2009.01) |
| H04W 52/16 | (2009.01) |
| H04W 52/24 | (2009.01) |
| H04W 52/40 | (2009.01) |
| H04W 52/06 | (2009.01) |
| H04W 52/04 | (2009.01) |
| H04W 52/00 | (2009.01) |

(52) U.S. Cl.
CPC ............ *H04W 52/146* (2013.01); *H04W 52/06* (2013.01); *H04W 52/04* (2013.01); *H04W 52/00* (2013.01); *H04W 52/16* (2013.01); *H04W 52/241* (2013.01); *H04W 52/40* (2013.01)
USPC ........... 455/522; 455/69; 455/135; 455/277.2

(58) Field of Classification Search
CPC ... H04W 52/146; H04W 52/00; H04W 52/04; H04W 52/06; H04W 52/16; H04W 52/241; H04W 52/40
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS 7,403,513 B2 * 7/2008 Lee et al. ....................... 370/342
8,200,230 B2 * 6/2012 Nystrom et al. ............... 455/442

(Continued)

FOREIGN PATENT DOCUMENTS

| EP | 1128572 A1 | 8/2001 |
|---|---|---|
| EP | 1435698 A2 | 7/2004 |

(Continued)

*Primary Examiner* — Dominic E Rego
(74) *Attorney, Agent, or Firm* — Coats & Bennett, PLLC

(57) ABSTRACT

A power control applied to a radio network controller (40) when a user equipment (300) is in communication with a serving radio base station (10) and at least one other radio base station (20) involves the radio network controller (40) providing a quality representation of an uplink control channel (12) from the user equipment (300) to the serving radio base station (10). The radio network controller (40) generates an updated power quality target for a reference control channel based on the quality representation and transmits the updated power quality target to at least one of the serving radio base station (10) and the at least one other radio base station (20). Alternatively, the radio network controller (40) generates an updated power offset for the uplink control channel (12) relative a reference control channel based on the quality representation and transmits the updated power offset to the user equipment (300).

38 Claims, 7 Drawing Sheets

(56) References Cited

U.S. PATENT DOCUMENTS

| | | | |
|---|---|---|---|
| 8,694,044 B2* | 4/2014 | Hiltunen et al. | 455/522 |
| 2002/0094833 A1* | 7/2002 | Lieshout et al. | 455/522 |
| 2002/0123351 A1 | 9/2002 | Miyoshi et al. | |
| 2004/0166884 A1 | 8/2004 | Oh et al. | |
| 2005/0143012 A1 | 6/2005 | Gu et al. | |
| 2006/0246937 A1 | 11/2006 | Lindoff | |
| 2007/0010253 A1 | 1/2007 | Gunnarsson et al. | |
| 2007/0191047 A1 | 8/2007 | Catreux-Erceg et al. | |
| 2008/0045260 A1* | 2/2008 | Muharemovic et al. | 455/522 |
| 2008/0057994 A1 | 3/2008 | Duan et al. | |
| 2009/0047958 A1* | 2/2009 | Rimhagen et al. | 455/436 |
| 2009/0137264 A1 | 5/2009 | Matsumoto | |
| 2009/0264134 A1* | 10/2009 | Xu et al. | 455/437 |
| 2010/0087221 A1* | 4/2010 | Srinivasan et al. | 455/522 |
| 2011/0205983 A1* | 8/2011 | Bharadwaj et al. | 370/329 |

FOREIGN PATENT DOCUMENTS

| | | |
|---|---|---|
| EP | 1788720 A2 | 5/2007 |
| GB | 2358109 A | 7/2001 |
| WO | 03077584 A1 | 9/2003 |
| WO | 2006081875 A1 | 8/2006 |
| WO | 2007025137 A2 | 3/2007 |
| WO | 2009072945 A1 | 6/2009 |

\* cited by examiner

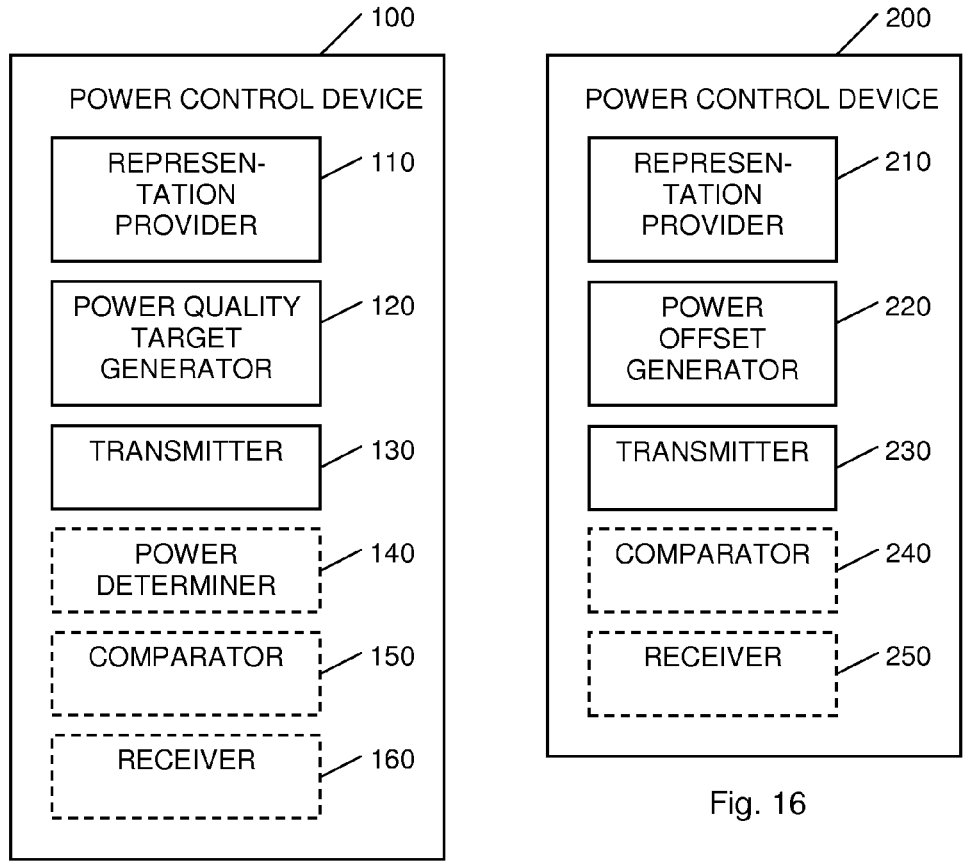
Fig. 15
Fig. 16
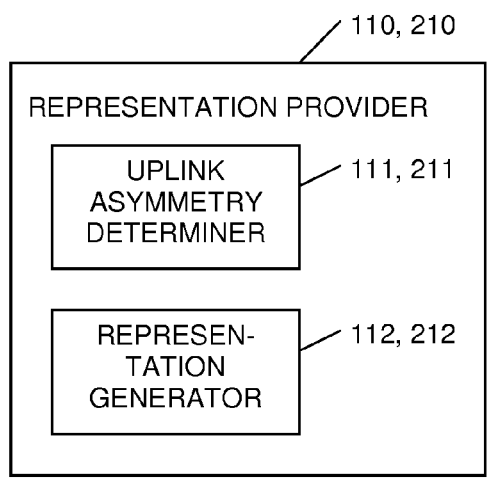
Fig. 17

UPLINK POWER CONTROL

TECHNICAL FIELD

The present embodiments generally relate to uplink power control in a communication network and, more particularly, to such a power control when a user equipment is connected to multiple radio base stations in the communication network.

BACKGROUND

One characteristics of Wideband Code Division Multiple Access/High Speed Packet Access (WCDMA/HSPA) is that downlink transmission to a specific user equipment is only performed by one radio base station, referred to as the serving radio base station. Evidently it is only the serving radio base station that benefits from knowledge of the physical layer information (Hybrid Automatic Repeat reQuest (HARQ) acknowledgement and Channel Quality Information/Pre-Coding Information (CQI/PCI)) transmitted on the High Speed Dedicated Physical Control Channel (HS-DPCCH) by the user equipment and thus only the serving radio base station decodes the HS-DPCCH.

Uplink data transmission from a user equipment can, in WCDMA/HSPA, on the other hand be received by multiple radio base stations. The set of radio base stations that decode the data transmissions from a particular user equipment constitute the active set for that user equipment. Some of the uplink related control channels are transmitted by all radio base stations in the active set, while some other control channels are transmitted by the serving radio base station only. One of the control channels transmitted by all radio base stations in the active set is the Fractional Dedicated Physical Channel (F-DPCH), which is used to control the transmit power of the user equipment. More specifically, transmit power control (TPC) commands sent on the F-DPCH adjust the Dedicated Physical Control Channel (DPCCH) transmit power of the user equipment.

The DPCCH transmit power is used as reference for all other physical channels transmitted by the user equipment. The power ratio between different physical channels is constant, which means that a change in the DPCCH transmit power will result in that the transmit powers of all other physical channels is also changed.

For a user equipment in soft handover (SHO) the transmit power on the uplink will be controlled by the radio base station associated with the highest Signal-to-Interference Ratio (SIR). FIGS. 2A and 2B schematically illustrate two examples of situations where a non-serving radio base station 20 would control the uplink power of the user equipment 300: 1) if the measured uplink interference level at the serving radio base station 10 is higher than the one measured by the non-serving radio base station 20 (FIG. 2A); and 2) if the pilot (DPCCH) power of the downlink is lower in the non-serving radio base station 20 than in the serving radio base station 10 (FIG. 2B). The latter can be a result of that the uplink link budget towards the non-serving radio base stations 20 is stronger than the link budget towards the serving radio base station 10.

In FIG. 2A, the interference level originating from another user equipment 30 can result in that the SIR target is only met by the non-serving radio base station 20. In FIG. 2B, the user equipment 300 will be power controlled by the non-serving radio base station 20 when the Common Pilot Channel (CPICH) power is lower for the non-serving radio base station 20 than for the serving radio base station 10 due to downlink asymmetry and the fact that the sending cell is based on downlink measurements. In both these cases the transmit power of the user equipment 300 is adjusted so that the quality at the non-serving radio base station 20 meets the desired target.

A consequence when the non-serving radio base station is controlling the uplink power is that the HS-DPCCH at the serving radio base station may become so weak that it cannot be correctly decoded or even detected. This can be a consequence of i) the received HS-DPCCH power at the serving radio base station is too weak and/or ii) the DPCCH quality at the serving radio base station is so weak that an adequate channel estimate cannot be derived at the serving radio base station.

The HS-DPCCH carries the HARQ acknowledgement and CQI/PCI related to the downlink transmission of the user equipment. This information is used by the serving radio base station to 1) decide how much information to transmit in a given Transmission Time Interval (TTI) and 2) decide whether a packet needs to be retransmitted. Inferior HS-DPCCH quality can thus result in that:

The HARQ acknowledgements indicating whether the user equipment was able to decode transmitted downlink transport blocks, are not detected or erroneously decoded. This will result in unnecessary layer 1 (L1) as well as Radio Link Control (RLC) retransmission.

The accuracy and availability of the CQI/PCI is reduced.

Hence there are good reasons for ensuring a sufficient HS-DPCCH quality at the serving radio base station.

To combat these effects in existing solutions the HS-DPCCH typically has a higher power offset in SHO than in non-SHO situations.

On top of this the network has the possibility to order the user equipment to always repeat the HARQ Acknowledgements/Negative acknowledgements (ACKs/NACKs) on the HS-DPCCH. The drawback with this solution is however a reduction in the achievable downlink bit rate since a HARQ ACK/NACK repetition factor of x results in that the network can only schedule packet transmission to the user equipment once every x:th TTI.

There is therefore a need for an efficient power control solution that can be applied to ensure the HS-DPCCH quality when a user equipment has more than one radio base station in its active set.

WO 2009/072945 describes a method and an arrangement of obtaining efficient power control during soft handover in a communication network system when a user equipment is in communication with two or more radio base stations over a radio interface on downlink and uplink channels. TPC commands are received from the two or more radio base stations on the downlink channels. The received TPC commands are analyzed and a power offset on the uplink channels is adjusted based on the analyzed TPC commands. This technique does not ensure that the DPCCH quality needed for channel estimation at the serving radio base station is sufficient.

SUMMARY

It is a general objective to provide efficient power control for a user equipment.

It is a particular objective to provide such a power control of an uplink control channel of the user equipment.

An aspect of the embodiments defines a power control method in a communication network when a user equipment is in communication with a serving radio base station and at least one other radio base station over a radio interface on uplink channels. The method comprises providing a quality representation at a radio network controller of an uplink control channel from the user equipment to the serving radio base station. The radio network controller generates an updated power quality target for a reference control channel based on this quality representation, and transmits the updated power quality target to at least one of the serving radio base station and the at least one other radio base station. This updated power quality target thereby controls the at least one of the serving radio base station and the at least one other radio base station to transmit at least one transmit power control command to the user equipment to trigger an adjustment of the transmit power of the uplink control channel.

Another aspect of the embodiments defines a power control method in a communication network when a user equipment is in communication with a serving radio base station and at least one other radio base station over a radio interface on uplink channels. The method comprises providing a quality representation at a radio network controller of an uplink control channel from the user equipment to the serving radio base station. Then the radio network controller generates an updated power offset for the uplink control channel relative a reference control channel based on the quality representation, and transmits the updated power offset to the user equipment to trigger an adjustment of the transmit power of the uplink control channel based on the updated power offset and a transmit power of the reference control channel.

A further aspect of the embodiments defines a power control device comprising a representation provider configured to provide a quality representation of an uplink control channel from the user equipment to the serving radio base station. A power quality target generator of the power control device is configured to generate an updated power quality target for a reference control channel based on the quality representation. The power control device also comprises a transmitter configured to transmit the updated power quality target to at least one of the serving radio base station and the at least one other radio base station. This updated power quality target thereby controls the at least one of the serving radio base station and the at least one other radio base station to transmit at least one transmit power control command to the user equipment to trigger an adjustment of the transmit power of the uplink control channel.

Yet another aspect of the embodiments defines a power control device comprising a representation provider configured to provide a quality representation of an uplink control channel from the user equipment to the serving radio base station. A power offset generator of the power control device is configured to generate an updated power offset for the uplink control channel relative a reference control channel based on the quality representation, and a transmitter configured to transmit the updated power offset to the user equipment to trigger an adjustment of the transmit power of the uplink control channel based on the updated power offset and a transmit power of the reference control channel.

BRIEF DESCRIPTION OF THE DRAWINGS

The embodiments, together with further objects and advantages thereof, may best be understood by making reference to the following description taken together with the accompanying drawings, in which:

FIG. 15 is a block diagram of a power control device according to an embodiment;

FIG. 16 is a block diagram of a power control device according to another embodiment;

FIG. 17 is a block diagram of an embodiment of the representation provider in FIG. 15 and FIG. 16;

DETAILED DESCRIPTION

The present embodiments generally relate to uplink power control in a communication network and, more particularly, to such a power control when a user equipment is connected to multiple radio base stations in the communication network.

Figure 1:
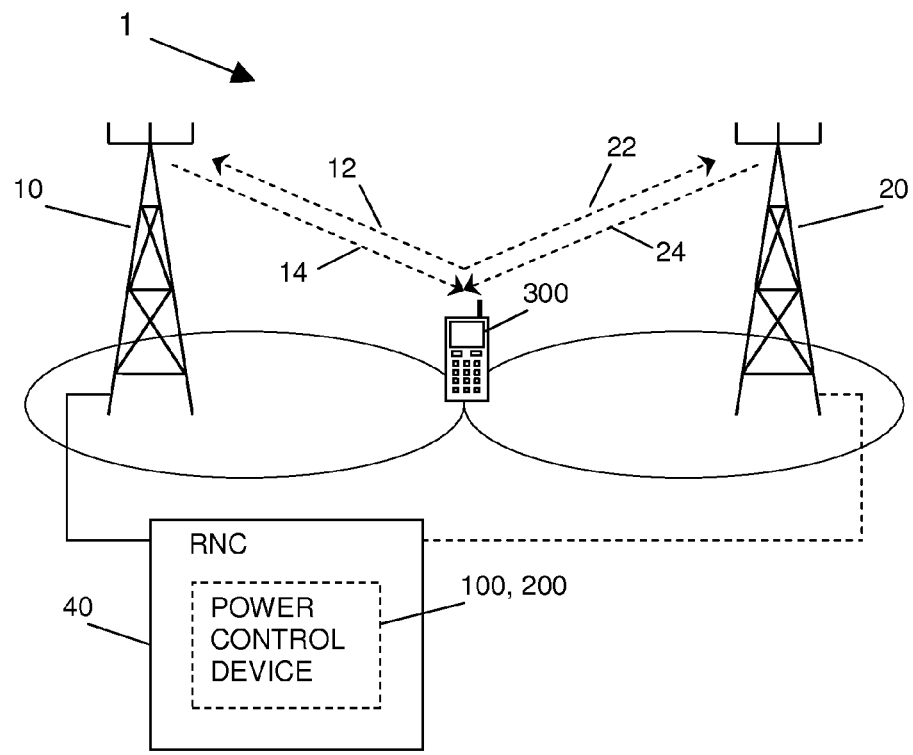
FIG. 1 is a schematic illustration of a communication network according to an embodiment.

FIG. 1 is a schematic overview of a portion of a communication network 1 to which the present embodiments can be applied. The communication network 1 is preferably a wireless, radio-based communication network or system providing communication services to connected user equipment(s) 300. In particular, the communication network 1 comprises multiple radio base stations 10, 20, also referred to as Node-B or base stations in the art. Each such radio base station 10, 20 provides communication services within a coverage area, typically denoted cell. The radio base stations 10, 20 are in turn connected to and controlled by a control network node 40, denoted Radio Network Controller (RNC) 40 in the art.

According to the embodiments, the user equipment 300 is in communication with multiple radio base stations 10, 20 over the radio interface. One of these radio base stations 10, 20 is then the so-called serving radio base station 10, whereas the at least one other radio base station 20 is denoted non-serving radio base station 20. Generally, downlink transmissions of user-specific data are typically only performed by the serving radio base station 10 on a downlink channel 14 towards the user equipment 300. However, uplink data transmissions from the user equipment 300 can on the contrary be received by not only the serving radio base station 10 but also by the at least one other radio base station 20. These uplink data transmissions are schematically illustrated by channels 12, 22 in FIG. 1. The serving radio base station 10 and the at least one other radio base station 20 form the so called active set of the user equipment 300. All radio base stations 10, 20 in the active set transmit some of the uplink related control channels as indicated in the background and schematically illustrated by the channels 14, 24 in FIG. 1.

Figure 2A:
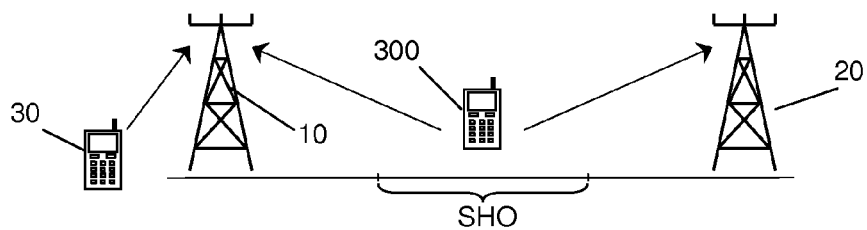
FIGS. 2A and 2B illustrate communication networks with a user equipment during soft handover.
Figure 2B:
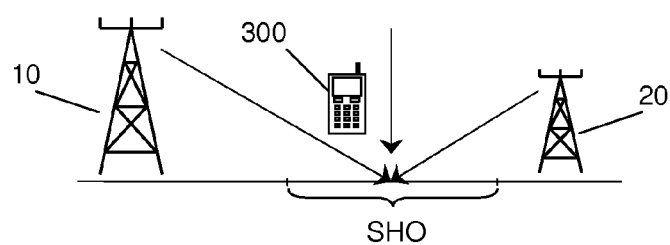

As indicated in the background section, in a communication network 1 with a user equipment 300 having an active set of multiple radio base stations 10, 20 the uplink power of the user equipment 300 could be controlled by a non-serving radio base station 20. FIGS. 2A and 2B illustrate such cases in connection with a user equipment 300 during soft handover (SHO). In FIG. 2B, the user equipment 300 will be power-controlled by the non-serving radio base station 20 when $G_B > G_A$, wherein the Common Pilot Channel (CPICH) power of the serving radio base station 10 is $G_A P_{CPICH, A}$ and the CPICH power of the non-serving radio base station 20 is $G_B P_{CPICH, B}$, where $G_{A,B}$ denotes respective path gain values. In this case, the transmit power of the user equipment 300 is adjusted so that the quality at the non-serving radio base station 20 meets its defined target. This situation is common if $PC_{PICH, B} < P_{CPICH, A}$. In FIG. 2A the interference levels in the two cells can result in that the Signal-to-Interference (SIR) target is only met by the non-serving radio base station 20. As a consequence, the transmit power of the user equipment 300 can be set by the non-serving radio base station 20 so that some of the uplink control channels are too weak and cannot be correctly decoded or even detected at the serving radio base station 10. In both figures, the SHO area is indicated by SHO and in FIG. 2B the point of serving cell change is indicated by an arrow.

Hence, there is today a problem within communication networks where a user equipment can be in communication with multiple radio base stations in terms of a power control of the user equipment performed by a non-serving radio base station. These problems are expected to become even worse in the future. Today, existing network deployments are usually based on macro radio base stations. All these macro radio base stations typically use similar transmission power. Moreover, traditionally user equipments are not designed to apply multi-antenna techniques in the uplink and the user equipment is typically scheduled in code division multiplexing (CDM) fashion.

Multi-antenna transmission techniques for the uplink enable beam forming so that the user equipment pre-codes the signals so that these add coherently at a receiver. Another way to interpret beam forming is that the pre-coding vector applied at the user equipment creates a beam towards a particular radio base station. This means that the pre-coding will increase the link asymmetry, e.g. if the beam is directed towards the non-serving radio base station. Hence, the previously discussed problems will become even worse with multi-antenna uplink transmission.

Today there is a trend to complement traditional macro radio base stations with micro and/or pico radio base stations. Such micro and pico radio base stations use less transmission power as compared to macro radio base stations. In order to benefit from micro and pico radio base stations in the downlink it is therefore desirable that serving radio base station (or cell) changes are based on $E_c/I_0$ (ratio of received energy per chip and the interference level) measurements. This will, however, result in that the cell border is moved towards the non-serving radio base station. The previously discussed problems will therefore become even worse with the introduction of micro and/or pico radio base stations.

In order to reduce intra-cell interference the serving radio base station can choose to time multiplex the transmission of two or more user equipments. Assuming that the interference from other cells ($I_{OtherCell}$) is constant, the SIR can be approximated for a user equipment by:

$$SIR_{DPCCH} = \frac{P_{DPCCH}}{I_{Self} + I_{OtherCell} + P_n}$$

when the user equipment is scheduled and:

$$SIR_{DPCCH} = \frac{P_{DPCCH}}{I_{OwnCell} + I_{OtherCell} + P_n}$$

when another user equipment is scheduled, wherein $P_{DPCCH}$ denotes the transmit power of the Dedicated Physical Control Channel (DPCCH) and $P_n$ denotes the power of the noise. By noting that the own cell interference from other users ($I_{OwnCell}$) is typically greater than the self-interference due to multi-path fading ($I_{Self}$), it is clear that the SIR will be significantly lower when a user equipment is not scheduled compared to when the user equipment is scheduled. Hence, the SIR will vary significantly depending on whether the user equipment is scheduled or not in a certain time slot.

Thus, it becomes evident from above that the shortcomings of the prior art techniques will suffer even more in the near future. Hence, there is a need for a more efficient power control solution than the prior art solution of merely switching to a higher power offset for a user equipment in SHO. The present embodiments provide such a more efficient solution to the power control problems that can arise when a user equipment is in communication with both a serving radio base station and at least one other radio base station.

According to a preferred embodiment the communication network is herein described as a Wideband Code Division Multiple Access (WCDMA) communication network. The skilled person, however, realizes that the described method and device work very well also on other communication systems, such as the Global System for Mobile Communications (GSM) or Long Term Evolution (LTE) system. The user equipments 300 may be mobile stations such as mobile telephones ("cellular" telephones) or laptops with mobile termination and can thus be, for example, portable, pocket, hand-held, computer-included or car-mounted mobile devices which communicate voice and/or data with the communication network.

The basic concept of the embodiments described herein is to introduce methods whereby the transmit power of an uplink control channel of a user equipment can be dynamically adapted based on existing feedback information available in the communication network. The power adaptation is performed by a power control device 100, 200 in the RNC 40, see FIG. 1. Details of the preferred embodiments are described below.

Figure 3:
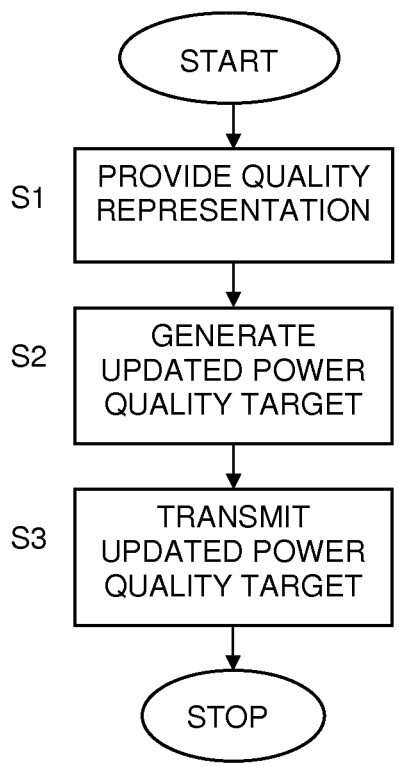
FIG. 3 is a flow chart showing a power control method according to an embodiment.

FIG. 3 is a flow chart illustrating a power control method according to an embodiment. The present power control method is applied when a user equipment is in communication with a serving radio base station and at least one other radio base station, i.e. has at least two radio base stations in its active set. An example of such a situation is during SHO. The embodiments are, however, not limited thereto. Also other situations where the user equipment has uplink channels to multiple radio base stations are possible and within the scope of the embodiments. An example of such another situation is when radio base stations transmit multiple downlink streams of data to a user equipment.

The method generally starts in step S1 where the RNC provides a quality representation of or for an uplink (UL) control channel from the user equipment to the serving radio base station. This provided quality representation, hence, reflects and is indicative of a quality of the particular UL control channel to the serving radio base station. In a next step S2, the RNC generates an updated power quality target for a reference control channel based on the quality representation provided in step S1. In a next step S3, the RNC transmits the updated power quality target to at least one of the radio base stations in the active set of the user equipment. This will cause the at least one radio base station to send at least one transmit power control (TPC) command to the user equipment to thereby adjust the transmit power of the UL control channel.

The term power quality refers to any suitable measure or estimate of the signal strength or power estimate for a particular channel. The power quality of a channel could preferably be represented by the SIR for that channel, or by the received power for that channel. Accordingly, the term power quality target could refer to e.g. SIR target or received power target.

When a radio base station, such as the serving radio base station, in the active set of the user equipment receives the updated power quality target from the RNC, it will compare this updated power quality target with the current power quality for the reference control channel for the user equipment. In the case when the current power quality for the reference control channel for the user equipment is lower than the updated power quality target generated by the RNC, the radio base station will send TPC commands to the user equipment to increase the transmit power of the UL control channel, i.e. the radio base station will send so-called TPC UP commands to the user equipment. The radio base station will continue to send TPC UP commands to the user equipment until the current power quality for the reference control channel for the user equipment corresponds to the updated power quality target generated by the RNC. Alternatively, if the current power quality for the reference control channel for the user equipment is higher than the updated power quality target generated by the RNC, the radio base station will instead send TPC commands to the user equipment to decrease the transmit power of the UL control channel, i.e. the radio base station will send so-called TPC DOWN commands to the user equipment, until the current power quality for the reference control channel for the user equipment corresponds to the updated power quality target generated by the RNC.

The UL control channel for which a quality representation is provided in step S1 is preferably a control channel that is used by the user equipment for transmitting downlink feedback information to the serving radio base station. In particular, the UL control channel is preferably used by the user equipment for transmitting Hybrid Automatic Repeat request (HARQ) acknowledgements/non-acknowledgements (ACKs/NACKs) and/or Channel Quality Information/Pre-Coding Information (CQI/PQI) to the serving radio base station. A preferred implementation embodiment that is adapted to a communication network employing WDCMA/High Speed Packet Access (WCDMA/HSPA) is when the UL control channel is a High Speed Dedicated Physical Control Channel (HS-DPCCH).

The quality representation could be based solely on the quality of the UL control channel, preferably HS-DPCCH. In an alternative approach, it could be based on the quality situation of this UL control channel and at least one other UL control channel and/or at least one UL data channel. An example, of the latter is the Enhanced Dedicated Channel (E-DCH). Hence, in such a case, the quality representation could, for instance, be a combined quality estimate of the quality at the HS-DPCCH and the E-DCH. Different combinations are possible, such as adding a weighted combination, an average quality value, etc.

The reference control channel for which the updated power quality target is generated in step S2 is preferably a physical control channel that is received by all radio base stations in the active set. The transmit power of the reference control channel is used as a reference for the transmit power of all other physical channels. A preferred implementation embodiment that is adapted to a communication network employing WCDMA/HSPA is when the reference control channel is a Dedicated Physical Control Channel (DPCCH).

TPC commands are generally transmitted on UL related control channels that are sent by the serving radio base station and the at least one other radio base station. In a particular embodiment, this UL related control channel is the previously mentioned Fractional Dedicated Physical Channel (F-DPCH) that is sent by all radio base stations in the active set for the user equipment. TPC is a general technique used to prevent too much unwanted interference between different transmitters and receivers in a communication network. The idea of using TPC is to automatically reduce the used transmission power of a user equipment to thereby reduce any interference problems and in addition receive an increased battery capacity of the user equipment.

As discussed in the foregoing, the RNC sends the updated power quality target to at least one radio base station in the active set. Thus, in an embodiment, the RNC transmits the updated power quality target to only a single radio base station in the active set, such as the serving radio base station. In an alternative embodiment, the RNC transmits an updated power quality target to all radio base stations in the active set or to a portion of the radio base stations. In these two latter embodiments, the same updated power quality target could be sent to the radio base stations or different updated power quality targets could be sent to different radio base stations as is further disclosed here below.

The updated power quality target could be an updated Outer Loop Power Control (OLPC) target for radio base stations in the active set.

Figure 4:
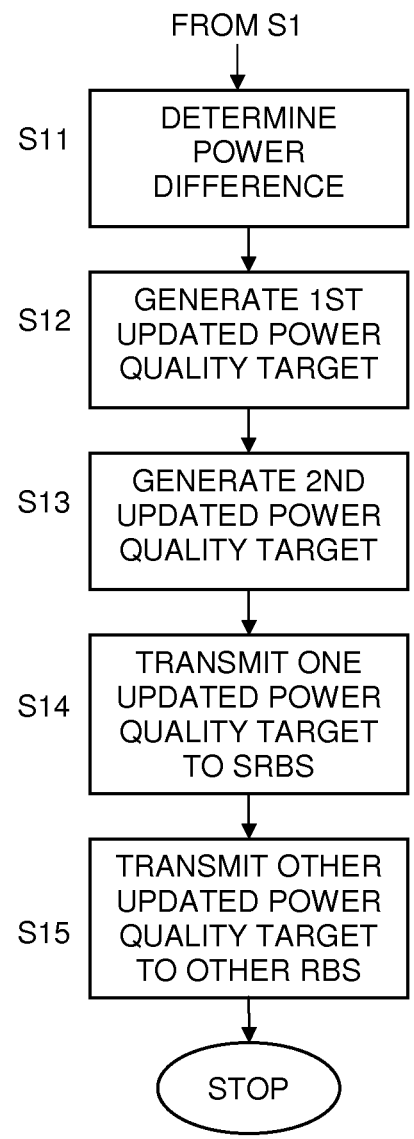
FIG. 4 is a flow chart showing a particular embodiment of the generating and transmitting steps in FIG. 3.

FIG. 4 is a flow chart illustrating an embodiment of the generating step S2 and transmitting step S3 of FIG. 3. Here, the RNC takes the difference in transmit power between the serving radio base station and the non-serving radio base station(s) into account when determining the updated power quality target for the radio base stations in the active set. This power difference, such as between the CPICH in the different radio base stations, is a configurable value and is known by the RNC or can be sent to the RNC. In the embodiment of FIG. 4, the power difference between the serving radio base station and the non-serving radio base station is determined in step S11. In a step S12, a first updated power quality target is generated based on the quality representation that was provided in step S1 of FIG. 3, and in a step S13 a second updated power quality target is generated based on this first updated power quality target in combination with the power difference between the different radio base stations as determined in step S11. In a step S14 one of the generated updated power quality targets is transmitted to the serving radio base station, and in a step S15 the other generated updated power quality target is transmitted to the non-serving radio base station. For example, if the user equipment is in SHO with two radio base stations whereof the non-serving radio base station has x dB less transmission power and the updated power quality target associated with the serving radio base station is determined in step S12 to be $\gamma_{serv}$, then the RNC introduces a power offset at the non-serving radio base station and sets an updated power quality target for the non-serving radio base station $\gamma_{non-serv} = \gamma_{serv} + h(x)$ in step S13, where h( ) typically would be a non-decreasing function, for an embodiment h(x)=x. By introducing an offset to the power quality target at the non-serving radio base station the Inner Loop Power Control (ILPC) behavior will be similar as if both the serving and the non-serving radio base station used the same power quality target but where the effective path gain between the user equipment and the non-serving radio base station was h(x) dB smaller. This would be one way to prevent too low received power in the serving radio base station and thus protect the quality of the UL control channel.

Figure 5:
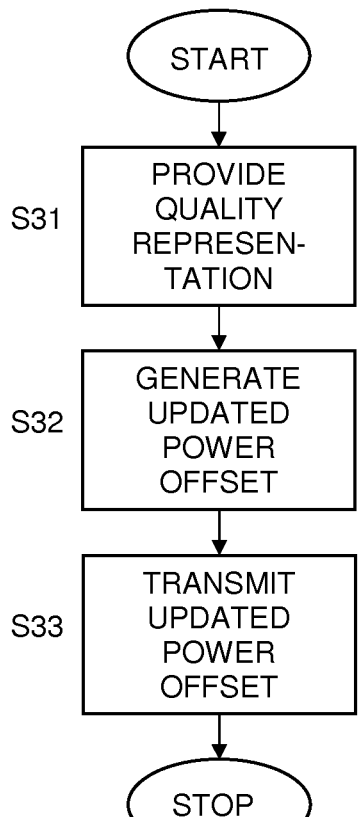
FIG. 5 is a flow chart showing a power control method according to another embodiment.

FIG. 5 is a flow chart illustrating a power control method according to an alternative embodiment when a user equipment is in communication with a serving radio base station and at least one other radio base station. Here, the providing step S31 basically corresponds to the providing step S1 of FIG. 3 and is therefore not further discussed herein. In a next step S32 the RNC generates an updated power offset for the UL control channel, preferably HS-DPCCH, relative the reference control channel, preferably DPCCH, based on the quality representation provided in step S31. In a next step S33 the RNC transmits the updated power offset to the user equipment in order to trigger the user equipment to adjust the transmit power of the UL control channel, based on the updated power offset generated in step S32 and the transmit power of the reference control channel.

As discussed above, the transmit power for the reference control channel is used as reference for all other physical channels transmitted by the user equipment. The transmit power of all other physical channels have a power offset relative to the reference control channel. The power offsets for the different physical channels are defined by different semi-static quantized amplitude ratios that are signaled by the RNC to the user equipment on the different physical channels. To exemplify, the transmit power of the HS-DPCCH can be written as $$P_{HS-DPCCH} = \left(\frac{\beta_{hs}}{\beta_c}\right)^2 P_{DPCCH}$$

where $P_{HS-DPCCH}$ and $P_{DPCCH}$ are the transmit powers associated with the HS-DPCCH and DPCCH respectively, and $\beta_{hs}$ and $\beta_c$ are semi-static quantized amplitude ratios that are signaled by the RNC. Hence, in an embodiment an increased power offset could be implemented as a higher ratio $\beta_{hs}/\beta_c$ signaled by the RNC to the user equipment. Thus, if the updated power offset for the HS-DPCCH (UL control channel) relative the DPCCH (reference control channel) generated in step S32 of FIG. 5 is higher than the original power offset, the user equipment will increase the transmit power for the UL control channel. Correspondingly, a decreased power offset could be implemented as a lower ratio $\beta_{hs}/\beta_c$ signaled by the RNC to the user equipment. Thus, if the updated power offset for the HS-DPCCH (UL control channel) relative the DPCCH (reference control channel) generated in step S32 of FIG. 5 is lower than the original power offset, the user equipment will decrease the transmit power for the UL control channel.

When the RNC has determined an updated power offset (an updated configuration for $\beta_{hs}/\beta_c$) for the UL control channel relative the reference control channel for a user equipment, the RNC could also store the current active set of radio base stations associated with that user equipment. Then the RNC can base its configuration of $\beta_{hs}/\beta_c$ for future user equipments with a similar active set on this updated power offset. This approach would allow the RNC to "learn" what an appropriate $\beta_{hs}/\beta_c$ for a particular active set is.

The methods illustrated in FIG. 3 and FIG. 5 both result in that the transmit power of the UL control channel for the user equipment is dynamically adapted based on a quality representation provided by the RNC. There is however a difference between the methods in how the adaptation of the transmit power is performed. In the method of FIG. 3 the RNC first sends an updated power quality target to the radio base stations in the active set, and then a radio base station triggers the adaptation of the transmit power by sending TPC commands to the user equipment to adapt the transmit power of the UL control channel. In the method of FIG. 5 the RNC more directly triggers the adaptation of the transmit power by sending an updated power offset directly to the user equipment to adapt the transmit power of the UL control channel.

In the embodiment discussed above in connection with FIG. 3, a TPC UP command will cause an increase in $P_{DPCCH}$ at the user equipment. Such an increase in transmit power of the DPCCH will lead to an increase in transmit power of the user equipment also for the HS-DPCCH through the relationship $$P_{HS-DPCCH} = \left(\frac{\beta_{hs}}{\beta_c}\right)^2 P_{DPCCH}.$$

In the embodiment discussed above in connection with FIG. 5, an updated (higher) power offset $\beta_{hs}/\beta_c$ will also lead to an increase in the transmit power of the HS-DPCCH but not necessarily of the DPCCH.

In a further embodiment, these two techniques of achieving an increase in transmit power of the UL control channel, preferably HS-DPCCH, can be combined. In such a case, the RNC determines both an updated power quality target and an updated power offset based on the quality representation. The updated power quality target is transmitted to at least one radio base station in the active set of the user equipment, whereas the updated power offset is transmitted to the user equipment. Hence, in this embodiment the transmit power of the UL control channel $P_{HS-DPCCH}$) (can be increased due to both i) an increase in $P_{DPCCH}$ caused by transmission of TPC UP commands from the at least one radio base station and ii) an increase in $\beta_{hs}/\beta_c$.

In the following various implementation embodiments of the power control methods illustrated in FIGS. 3 and 5 will be further described.

The quality representation provided by the RNC in step S1 of FIG. 3 and step S31 in FIG. 5 can be any representation of the quality of the UL control channel, preferably in the form of a HS-DPCCH quality representation or estimate. The quality representation can be provided in a number of ways, and some examples will be given below.

Figure 6:
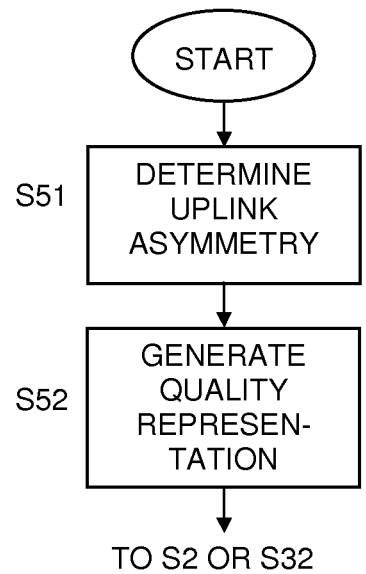
FIG. 6 is a flow chart showing a particular embodiment of the providing step in FIG. 3 and FIG. 5.

FIG. 6 is a flow chart illustrating an embodiment of the providing steps S1 of FIG. 3 and S31 of FIG. 5, respectively. In this embodiment the quality of the UL control channel, preferably HS-DPCCH, is determined by the RNC dynamically measuring the UL asymmetry, i.e. the difference in effective path gain associated with the serving radio base station and the non-serving radio base station(s). In a step S51 the UL asymmetry is determined by the RNC. In a next step S52 a quality representation for the UL control channel, preferably HS-DPCCH, is generated by the RNC based on this UL asymmetry. This quality representation is then used in step S2 of FIG. 3 to provide basis for generating the updated power quality target, and/or in step S32 of FIG. 5 to provide basis for generating the updated power offset.

In an embodiment the RNC dynamically measures the UL asymmetry between the serving radio base station and the non-serving radio base station(s) by monitoring the radio link control (RLC) retransmissions frequency on the UL control channel, preferably HS-DPCCH, for a user equipment. Generally a high UL asymmetry can cause an increase in RLC retransmissions frequency due to poor channel quality. The RNC can thus count the number of RLC retransmissions during a defined time period and use that number to determine the quality representation.

In another embodiment the RNC dynamically measures the UL asymmetry between the serving radio base station and the non-serving radio base station(s) by monitoring the fraction of packets received on an enhanced UL channel, preferably the E-DCH, from the serving radio base station. If most of these packets come from the serving radio base station it is an indication that the serving radio base station is strong, i.e. there are no problems with the UL control channel. But if most packets come from the non-serving radio base station, i.e. a smaller portion comes from the serving radio base station, there might be a problem with the quality of the UL control channel. Thus, the RNC could determine the fraction of packets received on E-DCH from the serving radio base station for a user equipment relative the total number of packets received on the E-DCH. The UL asymmetry can be characterized as a function of the fraction of packets received from the serving radio base station. The quality representation is then determined based on that function.

Figure 7:
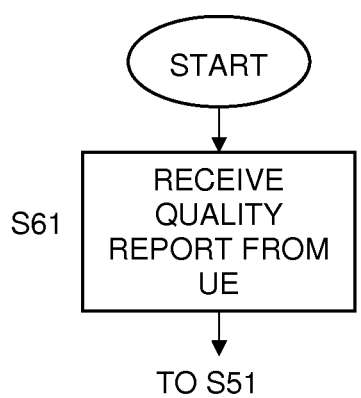
FIG. 7 is a flow chart showing an additional step of the flow chart in FIG. 6.

FIG. 7 illustrates an additional step S61 preceding the determining step S51 of FIG. 6. In this step S61 the RNC receives, from the user equipment using existing radio resource control (RRC) signaling, quality reports on signal quality for a downlink common pilot channel (CPICH) for the radio base stations in the active set. The quality report can be based on $E_C/N_0$ (ratio of received energy per chip and the noise level) measurements or path loss measurements, e.g. measurements of Received Signal Code Power (RSCP). The RNC then determines in step S51 the UL asymmetry between the serving radio base station and the non-serving radio base station(s) based on the quality reports from the user equipment for the downlink common pilot channel (CPICH). If the pilot power of the downlink is lower in the non-serving radio base station than in the serving radio base station, the uplink link budget towards the non-serving radio base stations is stronger than the link budget towards the serving radio base station, which means that there is high UL asymmetry. Hence, the quality reports can be used to determine the quality representation.

Figure 8:
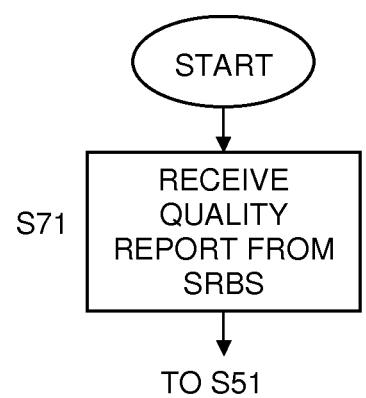
FIG. 8 is a flow chart showing an additional step of the flow chart in FIG. 6.

FIG. 8 illustrates an additional step S71 preceding the determining step S51 of FIG. 6. In this step S71 the RNC receives quality reports, from the serving radio base station (SRBS), on signal quality for a reference control channel, preferably DPCCH, for the user equipment based on power quality measurements, preferably SIR measurements, made by the serving radio base station. The RNC then determines in step S51 the UL asymmetry between the serving radio base station and the non-serving radio base station(s) based on the quality reports from the serving radio base station. If there is a significant difference in SIR on the reference control channel for the serving radio base station and the non-serving radio base station(s) then this indicates a high UL asymmetry between the serving radio base station and the non-serving radio base station(s). The RNC can therefore use these quality reports based on SIR measurements when determining the quality representation.

In the above described embodiments the RNC itself determines the quality representation. The embodiments are, though, not limited thereto. Other devices, such as the serving radio base station or the user equipment, in the communication network could instead determine the quality representation and transmit it to the RNC. Some examples of embodiments with such solutions are presented below.

In further embodiments, the quality representation for the UL control channel, preferably HS-DPCCH, can be determined based on at least two of the techniques disclosed in the foregoing. Thus, the quality representation can relate to any combination of i) monitoring the RLC retransmissions frequency on an UL control channel, preferably HS-DPCCH, ii) monitoring the fraction of packets received on an enhanced UL channel, preferably E-DCH, from the serving radio base station, iii) monitoring signal quality or path loss measurements on the downlink CPICH reported from the user equipment, iv) monitoring power quality measurements, preferably SIR measurements, made by the serving radio base station on a reference control channel, preferably DPCCH.

Figure 9:
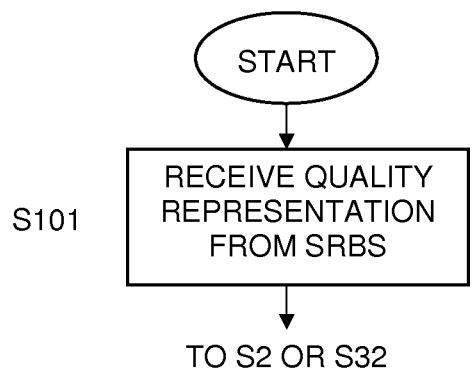
FIG. 9 is a flow chart showing a particular embodiment of the providing step in FIG. 3 and FIG. 5.

FIG. 9 is a flow chart illustrating an embodiment of the providing steps S1 of FIG. 3 and S31 of FIG. 5, respectively. In this embodiment the RNC receives a quality representation for the UL control channel, preferably HS-DPCCH, from the serving radio base station, based on measurements of the UL quality associated with a user equipment performed by the serving radio base station. The serving radio base station can transmit the quality representation, for instance, over Node-B Application Part (NBAP). In step S101 of this embodiment the RNC receives the quality representation for the UL control channel, preferably HS-DPCCH, from the serving radio base station. This quality representation is then passed on to step S2 of FIG. 3 and/or step S32 of FIG. 5, respectively. Hence, in this embodiment the serving radio base station determines and transmits the quality representation to the RNC.

Specific examples of how the serving radio base station can determine the quality representation are presented below.

In an embodiment the serving radio base station measures the UL quality associated with a user equipment by measuring the power quality on the reference control channel, preferably the DPCCH SIR. If the SIR on DPCCH is low compared to the SIR target it is an indication of a poor UL quality. The serving radio base station will then generate a quality representation for the UL control channel, preferably HS-DPCCH, based on these measurements and transmit this quality representation to the RNC.

In another embodiment the serving radio base station measures the UL quality associated with a user equipment by measuring the demodulation performance on an uplink dedicated data channel, preferably the E-DCH Dedicated Physical Data Channel (E-DPDCH). The demodulation performance corresponds to the probability that the UL control channel, preferably HS-DPCCH, cannot be correctly decoded at the serving radio base station. If the UL quality is poor, there is a high probability that the UL control channel, preferably HS-DPCCH, cannot be correctly decoded at the serving radio base station. The serving radio base station will then generate a quality representation for the UL control channel, preferably HS-DPCCH, based on these measurements and transmit this quality representation to the RNC.

In yet another embodiment the serving radio base station measures the UL quality associated with a user equipment by measuring the frequency with which the serving radio base station fails to detect transmission, such as HARQ-ACK/NACK, on the UL control channel, preferably HS-DPCCH, even though it has scheduled data on the downlink. If the HARQ ACKs/NACKs, indicating whether the user equipment was able to decode transmitted downlink transport blocks, are not detected or erroneously decoded, it is an indication that the quality of the UL control channel is inferior. The serving radio base station will then generate a quality representation for the UL control channel, preferably HS-DPCCH, based on these measurements and transmit this quality representation to the RNC.

In further embodiments, the quality representation for the UL control channel, preferably HS-DPCCH, can be determined based on at least two of the techniques disclosed in the foregoing. Thus, the quality representation can relate to any combination of i) measuring the power quality on the reference control channel, preferably DPCCH SIR, ii) measuring the demodulation performance on an uplink dedicated data channel, preferably E-DPDCH, iii) measuring the frequency with which the serving radio base station fails to detect transmission on the UL control channel, preferably HS-DPCCH, even though it has scheduled data on the downlink.

Figure 10:
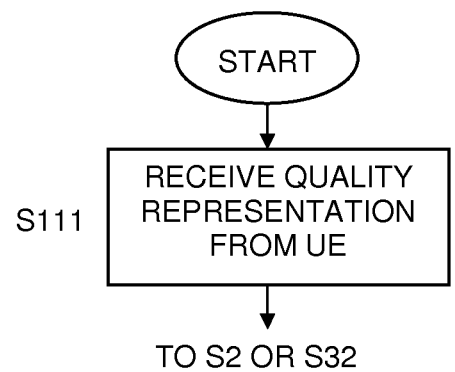
FIG. 10 is a flow chart showing a particular embodiment of the providing step in FIG. 3 and FIG. 5.

FIG. 10 is a flow chart illustrating an embodiment of the providing steps S1 of FIG. 3 and S31 of FIG. 5, respectively. In this embodiment the RNC receives a quality representation for the UL control channel, preferably HS-DPCCH, from the user equipment, based on measurements of the UL quality at the serving radio base station performed by the user equipment. In step S111 of this embodiment the RNC receives the quality representation for the UL control channel, preferably HS-DPCCH, from the user equipment. This quality representation is then passed on to step S2 of FIG. 3 and/or step S32 of FIG. 5, respectively. Hence, in this embodiment the user equipment determines and transmits the quality representation to the RNC.

Specific examples of how the user equipment can determine the quality representation are presented below.

In an embodiment the user equipment compares the HARQ-ACK messages it has transmitted on the UL control channel, preferably HS-DPCCH, to the serving radio base station with the packet transmission that it receives on a downlink channel from the serving radio base station. Thus, if the user equipment previously has successfully received a packet on the downlink channel and transmitted a HARQ-ACK on the UL control channel to the serving radio base station with the regard to that packet, but anyway receives a retransmission of the same packet and/or an increased redundancy version, then this is an indication that the UL control channel quality at the serving radio base station is inferior. Hence, in this embodiment the user equipment generates the quality representation for the UL control channel, preferably HS-DPCCH, based on a comparison of transmission acknowledgement messages transmitted on the UL control channel with packet transmissions received on a downlink data channel from the serving radio base station. This quality representation is then transmitted to the RNC.

In another embodiment the user equipment monitors for TPC commands received from the serving radio base station and generates the quality representation based on these received TPC commands. Thus, if the user equipment detects a significant amount of TPC UP commands from the serving radio base station during a defined time period, this is an indication that the UL control channel, preferably HS-DPCCH, quality is inferior and that the user equipment could be power-controlled by a non-serving radio base station. Hence, in this embodiment the user equipment generates the quality representation based on monitoring of TPC commands transmitted from the serving radio base station to the user equipment. The quality representation could then be an indication of the percentage of the TPC commands that, during a defined time period or a defined number of TPC commands, indicate an increase in transmit power of the user equipment. An alternative but related approach is to determine the quality representation based on the percentage of the TPC commands from the serving radio base station that indicate a decrease in transmit power of the user equipment, i.e. so-called TPC DOWN commands. The quality representation for the UL control channel, preferably HS-DPCCH, generated by the user equipment is then transmitted to the RNC.

In a further embodiment the user equipment estimates the difference in downlink (DL) path loss between the serving radio base station and the at least one other non-serving radio base station. Such a downlink path loss based procedure can be performed based on path loss estimations of a respective pilot channel, such as CPICH, from the radio base stations in the active set. The path losses represent the reduction in power density or attenuation of the signals transmitted from the radio base stations towards the user equipment. The path loss may be due to various effects, such as free-space loss, refraction, diffraction, reflection and absorption. The path losses can be estimated or predicted by the user equipment according to methods well known in the art, such as statistical or stochastic methods or deterministic methods. Thus, in this embodiment the user equipment generates the quality representation for the UL control channel, preferably HS-DPCCH, based on estimating the difference in downlink path loss between the serving radio base station and the at least on other radio base station. This quality representation is then transmitted to the RNC.

In a further embodiment, the user equipment generates the quality representation for the UL control channel, preferably HS-DPCCH, based on a combination of at least two of the above presented embodiments. Thus, in such a case the quality representation is determined based on at least two of the techniques disclosed in the foregoing and relating to i) comparing transmitted HARQ ACK/NACK messages with received data packets, ii) monitoring TPC commands from the serving radio base station and iii) estimating DL path loss difference.

It is further possible to use a quality representation that is determined as a combination of a quality representation value as determined by the RNC, a quality representation value as received from the serving radio base station, and/or a quality representation value as received from the user equipment.

Figure 11:
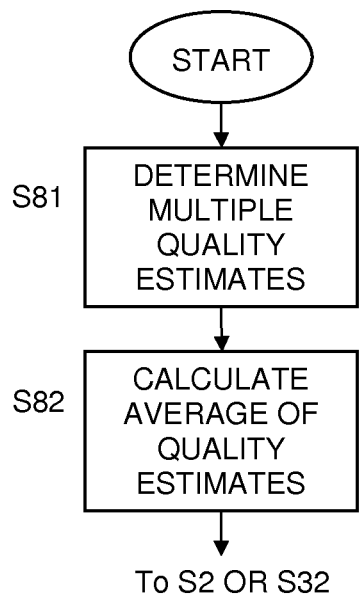
FIG. 11 is a flow chart showing a particular embodiment of the providing step in FIG. 3 and FIG. 5.

FIG. 11 is a flow chart illustrating an embodiment of the providing steps S1 of FIG. 3 and S31 of FIG. 5, respectively. In step S81 of this embodiment the RNC determines multiple quality estimates for the UL control channel, preferably HS-DPCCH, at different time instances. In such a case, the RNC can be configured to perform this step S81 over a predefined period of time to thereby determine the quality estimates during this period of time. In an alternative approach, the RNC is configured to determine a predefined number of quality estimates. The quality estimates determined in step S81 are obtained according to any of the previously described embodiments. Thus, the RNC then has access to multiple quality estimates reflecting the quality of the UL control channel at multiple different time instances: $Q_{HS-DPCCH}(t)$, $Q_{HS-DPCCH}(t-1)$, ..., $Q_{HS-DPCCH}(t-M)$, $M \geq 1$. These multiple different time instances are then co-processed in order to calculate the quality representation based on these multiple quality estimates. Hence, the quality representation is in this embodiment a function of the multiple quality estimates, i.e. $f(Q_{HS-DPCCH}(t), Q_{HS-DPCCH}(t-1), \ldots, Q_{HS-DPCCH}(t-M))$.

FIG. 11 also illustrates a particular example of a function that can be used according to the embodiments to calculate the quality representation. In a next step S82 of FIG. 11 the quality representation is calculated as an average of the multiple quality estimates determined in step S81. Hence, the quality representation is thereby calculated as $$\frac{Q_{HS-DPCCH}(t), Q_{HS-DPCCH}(t-1), \ldots, Q_{HS-DPCCH}(t-M)}{M+1}.$$

Thus, in this embodiment the quality representation reflects an average quality situation for the UL control channel, preferably HS-DPCCH, during the time for which the quality estimates have been determined in step S81. This quality representation is then passed on to step S2 of FIG. 3 and/or step S32 of FIG. 5, respectively.

In another but related embodiment, the function $f( )$ does not output the average of the multiple quality estimates but rather the median of the multiple quality estimates. Also this embodiment will calculate a quality representation that reflects an average quality situation for the UL control channel, preferably HS-DPCCH.

Figure 12:
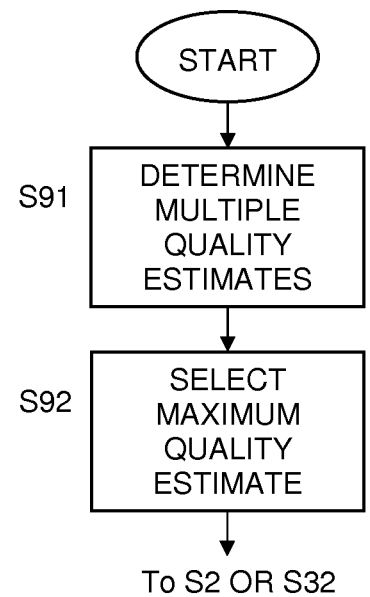
FIG. 12 is a flow chart showing a particular embodiment of the providing step in FIG. 3 and FIG. 5.

FIG. 12 is a flow chart illustrating another embodiment of the providing steps S1 of FIG. 3 and S31 of FIG. 5, respectively. In step S91 of this embodiment the RNC determines multiple quality estimates for the UL control channel, preferably HS-DPCCH, at different time instances. This step S91 basically corresponds to step S81 of FIG. 11 and is therefore not further discussed herein. In a next step S92 another function $f( )$ than calculating an average or median of the quality estimates is used to get the quality representation. Thus, step S92 selects the maximum quality estimate among the quality estimates determined in step S91 and uses this selected quality estimate as the quality representation for the UL control channel, preferably HS-DPCCH. Thus, the quality representation is $\max(Q_{HS-DPCCH}(t), Q_{HS-DPCCH}(t-1), \ldots, Q_{HS-DPCCH}(t-M))$. Hence, in this embodiment the user equipment investigates whether the quality for the UL control channel, preferably HS-DPCCH, lies below the quality represented by a threshold value for the time period during which the quality estimates are determined. Such a situation then indicates a poor HS-DPCCH quality. This quality representation for the UL control channel is then passed on to step S2 of FIG. 3 and/or step S32 of FIG. 5, respectively.

In an alternative embodiment, the function $f( )$ instead selects the minimum quality estimate among the multiple quality estimates. Hence, the quality representation is $\min(Q_{HS-DPCCH}(t), Q_{HS-DPCCH}(t-1), \ldots, Q_{HS-DPCCH}(t-M))$. This embodiment is particularly suitable for a situation with excessive quality of the HS-DPCCH.

Figure 13:
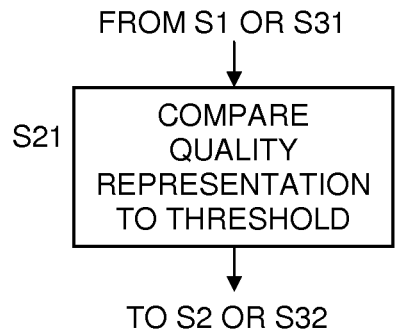
FIG. 13 is a flow chart showing an additional step of the power control method in FIG. 3 and FIG. 5.

FIG. 13 illustrates an additional step S21 of the embodiments shown of FIG. 3 and FIG. 5. In the step S21, the quality representation that was provided in step S1 of FIG. 3, or step S31 of FIG. 5, is compared with a threshold value. Thus, the user equipment then investigates whether $f(Q_{HS-DPCCH}(t), Q_{HS-DPCCH}(t-1), \ldots, Q_{HS-DPCCH}(t-M)) < Q_1$, where $Q_1$ represents the threshold value. In this embodiment, a low value of the quality representation indicates a poor quality of the UL control channel, preferably HS-DPCCH. Hence, if the quality representation is below the threshold value this indicates a poor channel quality and that it is likely that the user equipment will be power controlled by a non-serving radio base station. In an alternative approach, a high quality representation could indicate a poor quality of the UL control channel. In such a case, step S21 preferably investigates whether the quality representation exceeds the threshold value. This would then indicate a poor channel quality and a high probability that the user equipment is power controlled by a non-serving radio base station.

Hence, step S21 of FIG. 13 preferably investigates whether the quality of the UL control channel, preferably HS-DPCCH, as indicated by the quality representation, is poorer or worse than a threshold quality, as represented by the threshold value. In such a case, the RNC should in step S2 of FIG. 3 generate an updated power quality target, and/or in step S32 of FIG. 5 generate an updated power offset, where the updated power quality target/power offset is selected to combat the poor channel quality. A poor quality of the UL control channel, preferably HS-DPCCH, suggests that the power quality target for the reference control channel, preferably DPCCH, should be increased in order to ensure proper detection and decoding of the UL control channel, preferably HS-DPCCH. Alternatively, the power offset for the UL control channel, preferably HS-DPCCH, relative the reference control channel, preferably DPCCH, should be increased in order to ensure proper detection and decoding of the UL control channel, preferably HS-DPCCH.

In clear contrast, if the channel quality of the UL control channel is sufficient as indicated by the comparison between the quality representation and the threshold value, the updated power quality target/power offset generated by the RNC in step S2 of FIG. 3 and/or step S32 of FIG. 5 should preferably be kept at the same level as before.

The present embodiments can in fact also be used in a situation where the quality of the UL control channel, preferably HS-DPCCH, is excessive. In such a case, a quality representation is provided for the UL control channel as previously disclosed herein in connection with step S1 of FIG. 3 and/or step S31 of FIG. 5. This quality representation is then compared to a threshold value in step S21. However, in this case the threshold value is preferably different from that in the previously disclosed embodiments. Hence, the threshold value preferably indicates a threshold for a maximum desirable quality for the UL control channel. The RNC advantageously provides the quality representation in this embodiment according to any of the embodiments discussed herein. This quality representation is then compared to the threshold value and if the quality representation exceeds the threshold value this indicates an excessive high quality of the UL control channel (or in an alternative embodiment if the quality representation is below the threshold value this indicates an excessive high quality) and then the updated power quality target/power offset generated by the RNC in step S2 of FIG. 3 and/or step S32 of FIG. 5 should preferably be decreased.

FIG. 15 is a schematic block diagram of an embodiment of a power control device 100 according to an embodiment. The power control device 100 is configured to be implemented in a RNC in a communication network.

According to one embodiment, the power control device 100 comprises a representation provider 110 that is configured to provide a quality representation of an UL control channel, preferably HS-DPCCH, from the user equipment to its serving radio base station. The power control device 100 further comprises a power quality target generator 120 configured to generate an updated power quality target for the reference control channel, preferably DPCCH, based on the quality representation provided by the representation provider 110. The power control device 100 also comprises a transmitter 130 configured to transmit the updated power quality target generated by the power quality target generator 120 to at least one of the radio base stations in the active set of the user equipment. This will cause at least one radio base station in the active set of the user equipment to send at least one TPC command to the user equipment to adjust the transmit power of the UL control channel.

In one particular embodiment shown in FIG. 15 the power control device 100 also comprises a power determiner 140 which is configured to determine a difference in transmit power between the serving radio base station and the non-serving radio base station. The power levels of individual radio base stations could then be signaled to the radio base station with the power determiner 140, which then calculates the power difference. Alternatively, the RNC determines the power difference. The power determiner 140 is illustrated with a dotted line in FIG. 15 indicating that it is part of an alternative embodiment and can be omitted from the basic block diagram of the power control device 100. The power difference determined by the power determiner 140 is then used by the power quality target generator 120 to generate a second updated power quality target based on a first updated power quality target and the power difference, where the first updated power quality target is generated based on the quality representation provided by the representation provider 110. The transmitter 130 in this embodiment will then transmit one of the updated power quality targets to the serving radio base station and the other updated power quality target to the non-serving radio base station.

FIG. 16 is a schematic block diagram of an embodiment of the power control device 100 according to an alternative embodiment. Here, the representation provider 210 basically corresponds to the representation provider 110 in FIG. 15 and is therefore not further discussed herein. The power control device 100 further comprises a power offset generator 220 configured to generate an updated power offset for the UL control channel, preferably HS-DPCCH, relative a reference control channel, preferably DPCCH, based on the quality representation provided by the representation provider 210. The power control device 100 also comprises a transmitter 230 configured to transmit the updated power offset generated by the power offset generator 220 to the user equipment in order to trigger the user equipment to adjust the transmit power of the UL control channel, based on the updated power offset generated by the power offset generator 220 and the transmit power of the reference control channel.

FIG. 17 is a schematic block diagram of an embodiment of the representation provider 110, 210 in FIG. 15 and FIG. 16, respectively. In this embodiment, the representation provider 110, 210 comprises an uplink asymmetry determiner 111, 211 configured to determine an UL asymmetry, i.e. the difference in effective path gain associated with the serving radio base station and the non-serving radio base station(s). The representation provider 110, 210 further comprises a representation generator 112, 212 configured to generate the quality representation for the UL control channel, preferably HS-DPCCH, based on the UL asymmetry between the serving radio base station and the non-serving radio base station(s) determined by the uplink asymmetry determiner 111, 211.

The uplink asymmetry determiner 111, 211 may be realized in different ways. According to an embodiment the uplink asymmetry determiner 111, 211 measures the UL asymmetry between the serving radio base station and the non-serving radio base station(s) by monitoring the RLC retransmissions frequency on the UL control channel, preferably HS-DPCCH, for the user equipment. Generally a high UL asymmetry can cause an increase in RLC retransmissions frequency due to poor channel quality. The uplink asymmetry determiner 111, 211 can thus count the number of RLC retransmissions during a defined time period and use that number to determine the UL asymmetry.

According to another embodiment the uplink asymmetry determiner 111, 211 measures the UL asymmetry between the serving radio base station and the non-serving radio base station(s) by monitoring the fraction of packets received by a receiver 160 (illustrated with a dotted line in FIG. 15), 250 (illustrated with a dotted line in FIG. 16) in the power control device 100, 200 on an enhanced UL channel, preferably E-DCH, from the serving radio base station. If most of these packets come from the serving radio base station it is an indication that the serving radio base station is strong, i.e. there are no problems with the UL control channel. But if most packets come from the non-serving radio base station (i.e. a smaller portion comes from the serving radio base station) there might be a problem with the quality of the UL control channel. Thus, the uplink asymmetry determiner 111, 211 could determine the fraction of packets received on E-DCH from the serving radio base station for a user equipment relative the total number of packets received on the E-DCH. The UL asymmetry can then be determined based on a function of the fraction of packets received from the serving radio base station. The receiver 160, 250 (illustrated with a dotted line in FIG. 15 and FIG. 16) in the power control device 100, 200 is employed for communication, preferably wireless radio-based communication, with radio base stations in the communication network.

According to a further embodiment the uplink asymmetry determiner 111, 211 estimates the UL asymmetry between the serving radio base station and the non-serving radio base station(s) based on a quality report on signal quality for a downlink common pilot channel (CIPCH) for the radio base stations in the active set, received from the user equipment by a receiver 160 (illustrated with a dotted line in FIG. 15), 250 (illustrated with a dotted line in FIG. 16) in the power control device 100, 200. The quality report can be based on $E_c/N_0$ measurements or path loss measurements, e.g. measurements of RSCP. The uplink asymmetry determiner 111, 211 then determines the UL asymmetry between the serving radio base station and the non-serving radio base station(s) based on the quality reports from the user equipment for the CPICH. If the pilot power of the downlink is lower in the non-serving radio base station than in the serving radio base station, the uplink link budget towards the non-serving radio base stations is stronger than the link budget towards the serving radio base station, which means that there is high UL asymmetry. Hence, the quality reports can be used to determine the UL asymmetry.

According to yet another embodiment the uplink asymmetry determiner 111, 211 estimates the UL asymmetry between the serving radio base station and the non-serving radio base station(s) based on a report on signal quality based on power quality measurements, preferably SIR measurements, on the reference control channel, preferably DPCCH, received from the serving radio base station by a receiver 160 (illustrated with a dotted line in FIG. 15), 250 (illustrated with a dotted line in FIG. 16) in the power control device 100, 200. If there is a significant difference in SIR on the reference control channel for the serving radio base station and the non-serving radio base station(s) then this indicates a high UL asymmetry between the serving radio base station and the non-serving radio base station(s).

Figure 20:
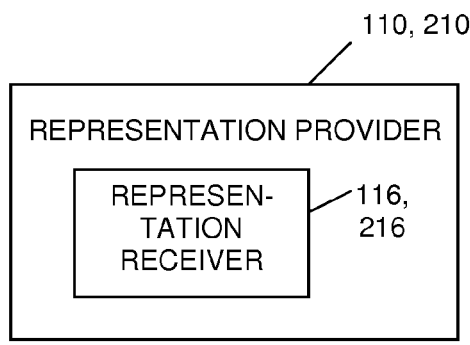
FIG. 20 is a block diagram of an embodiment of the representation provider in FIG. 15 and FIG. 16.

FIG. 20 is a schematic block diagram of another embodiment of the representation provider 110, 210 in FIG. 15 and FIG. 16, respectively. The representation provider here comprises a representation receiver 116, 216 configured to receive the quality representation for the UL control channel, preferably HS-DPCCH, from the serving radio base station, based on measurements of the UL quality associated with a user equipment performed by the serving radio base station. Alternatively, the representation receiver 116, 216 can be configured to receive the quality representation for the UL control channel, preferably HS-DPCCH, from the user equipment, based on measurements of the UL quality at the serving radio base station performed by the user equipment. In an embodiment, the receiver 160 in FIG. 15 or the receiver 250 in FIG. 16 could operate as representation receiver. The representation receiver 115, 116 can then be omitted.

In the embodiments where the representation receiver receives the quality representation from the serving radio base station, the serving radio base station could then determine the quality representation for the UL control channel, preferably HS-DPCCH, as previously disclosed herein, i.e. based on i) measurements of the power quality on the reference control channel, preferably DPCCH SIR, ii) measurements of the demodulation performance on an uplink dedicated data channel, preferably E-DPDCH, iii) measurements of the frequency with which the serving radio base station fails to detect transmission (such as HARQ-ACK/NACK) on the UL control channel, preferably HS-DPCCH, even though it has scheduled data on the downlink, or iv) a combination of any of i) to iii).

In the embodiments where the representation receiver receives the quality representation from the user equipment, the user equipment could then determine the quality representation for the UL control channel, preferably HS-DPCCH, as previously disclosed herein, i.e. based on i) a comparison of transmitted HARQ-ACK/NACK messages and received data packets, ii) monitoring TPC commands transmitted from the serving radio base station, iii) an estimation of the difference in path loss to the serving radio base station and to the non-serving radio base station, or iv) a combination of any of i) to iii).

Figure 18:
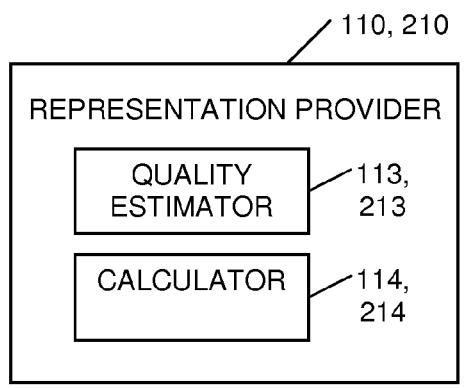
FIG. 18 is a block diagram of an embodiment of the representation provider in FIG. 15 and FIG. 16.

FIG. 18 is a schematic block diagram of an embodiment of the representation provider 110, 210 in FIG. 15 and FIG. 16, respectively. In this embodiment, the representation provider 110, 210 comprises a quality estimator 113, 213 configured to determine multiple quality estimates for the UL control channel, preferably HS-DPCCH, at different time instances. The quality estimator 113, 213 could then determine these quality estimates as previously disclosed herein. The representation provider 110, 210 further comprises a calculator 114, 214 configured to calculate the quality representation based on the multiple quality estimates determined by the quality estimator 113, 213. In this embodiment, the calculator 114, 214 could calculate the quality representation base on an average of the multiple quality estimates or as a median of the multiple quality estimates.

Figure 19:
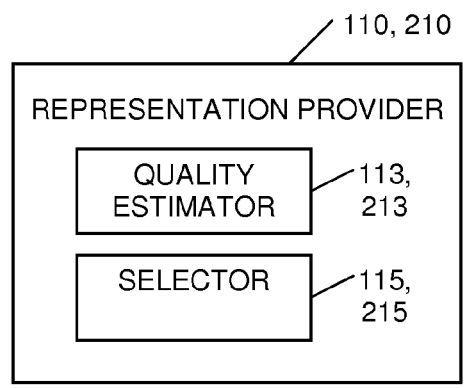
FIG. 19 is a block diagram of an embodiment of the representation provider in FIG. 15 and FIG. 16.

FIG. 19 is a schematic block diagram of another embodiment of the representation provider 110, 210 in FIG. 15 and FIG. 16, respectively. The representation provider 110, 210 comprises the previously described quality estimator 113, 213. However, in this embodiment the representation generator 110, 210 comprises a selector 115, 215 that is configured to select a maximum quality estimate among the multiple quality estimates from the quality estimator 113, 213 as the quality representation for the UL control channel, preferably HS-DPCCH. In an alternative embodiment, the selector 115, 215 instead selects the minimum quality estimate as the quality representation.

The embodiments of the representation provider 110, 210 illustrated in FIGS. 18 and 19 could alternatively be implemented by arranging the quality estimator 113, 213 and the calculator 114, 214 or the quality estimator 113, 213 and the selector 115, 215 as separate units in the power control device 100, 200.

In particular embodiments shown in FIG. 15 and FIG. 16 the power control device 100, 200 also comprises a comparator 150, 240 which is configured to compare the quality representation from the representation provider 110, 210 with a threshold value. The comparator 150, 240 is illustrated with a dotted line in FIG. 15 and FIG. 16 indicating that it is part of an alternative embodiment and can be omitted from the basic block diagram of the power control device 100, 200. In the embodiment shown in FIG. 15 the power quality target generator 120 will generate an updated power quality target based on the outcome of the comparison of the quality representation to the threshold value made by the comparator 150. In the embodiment shown in FIG. 16 the power offset generator 220 will generate an updated power offset based on the outcome of the comparison of the quality representation to the threshold value made by the comparator 240.

The units 110-160 of the power control device 100 and the units 210-250 of the power control device 200 can be implemented in hardware, in software or a combination of hardware and software. Although the respective units 110-160 and 210-250 disclosed in conjunction with FIGS. 15 and 16 and units 113, 213 and 114, 214 in FIG. 18 and units 113, 213 and 115, 215 in FIG. 19 have been disclosed as physically separate units 110-160 in the power control device 100 and the units 210-250 of the power control device 200, and all may be special purpose circuits, such as ASICs (Application Specific Integrated Circuits), alternative embodiments are possible where some or all of the units 110-160 and 210-250 are implemented as computer program modules running on a general purpose processor.

Figure 14:
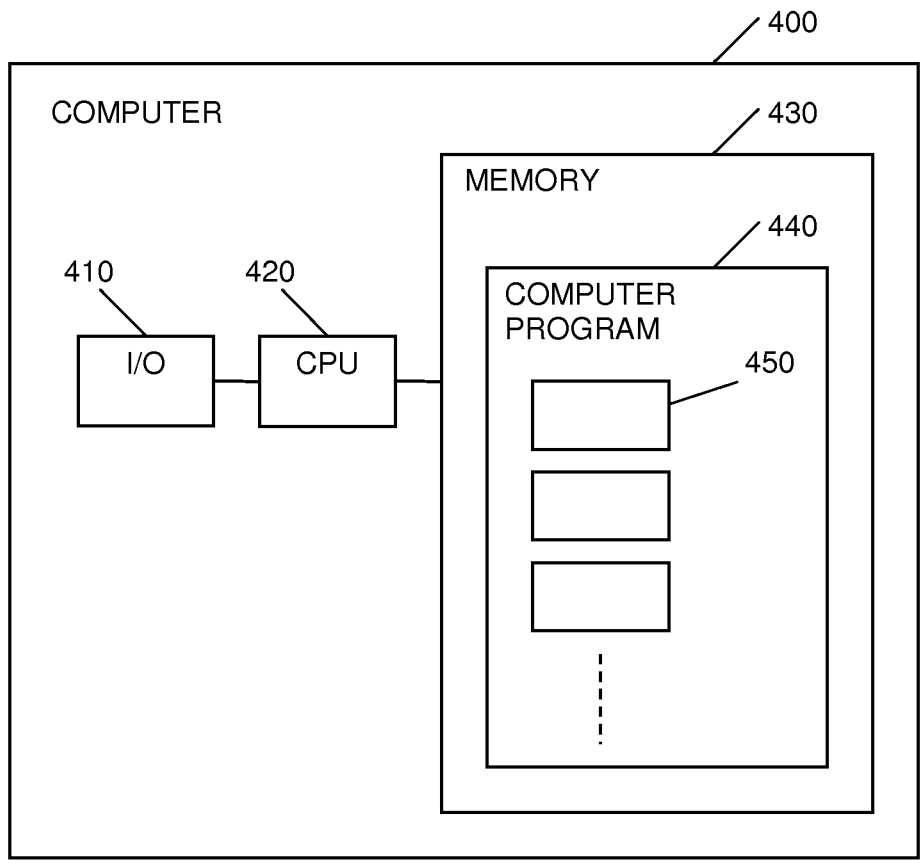
FIG. 14 is a block diagram of a computer according to an embodiment.

In such a case and with reference to FIG. 14, the power control device 100, 200 can be implemented in a computer 400 comprising a general input/output (I/O) unit 410 in order to enable communication with the radio base stations in the communication network, a processing unit 420, such as a DSP (Digital Signal Processor) or CPU (Central Processing Unit). The processing unit 420 can be a single unit or a plurality of units for performing different steps of the methods described herein. The computer 400 also comprises at least one computer program product 430 in the form of a non-volatile memory, for instance an EEPROM (Electrically Erasable Programmable Read-Only Memory), a flash memory or a disk drive. The computer program product 430 comprises a computer program 440, which comprises code means 450 which when run on the computer 400, such as by the processing unit 420, cause the computer 400 to perform the steps of the method described in the foregoing in connection with FIG. 3 and FIG. 5. Hence, in an embodiment the code means 450 in the computer program 440 comprises a representation providing module for providing a quality representation, a generating module for generating an updated power quality target (FIG. 3) or an updated power offset (FIG. 5) and a transmitting module for transmitting the updated power quality target (FIG. 3) or the updated power offset (FIG. 5). These modules essentially perform the steps of the flow charts in FIG. 3 and/or FIG. 5 when run on the processing unit 420. Thus, when the different modules 450 are run on the processing unit 420 they correspond to the corresponding units 110-130 of FIG. 15 and/or 210-230 of FIG. 16.

The computer program 440 may additionally comprise further modules performing steps as disclosed in connection with FIG. 4 and FIGS. 6-13.

The embodiments as disclosed herein can be used to achieve a certain the DPCCH SIR quality at the serving radio base station for a user equipment when in communication with multiple radio base stations, such as during SHO. By ensuring such a sufficient HS-DPCCH quality at the serving radio base station the downlink HDSPA performance is not affected. By being able to provide sufficient HS-DPCCH quality the embodiments enable introduction of techniques, such as multi-antenna transmission techniques for the uplink, complementing traditional macro radio base stations with micro and/or pico radio base stations and per-HARQ scheduling for improving uplink orthogonality, in communication networks.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A power control method in a communication network when a user equipment is in communication with a serving radio base station and at least one other radio base station over a radio interface on uplink channels, and the serving radio base station is connected to a radio network controller configured to implement the power control method, the method comprising:
   providing a quality representation of an uplink control channel from the user equipment to the serving radio base station;
   generating an updated power quality target for a reference control channel based on the quality representation; and
   transmitting the updated power quality target to at least one of the serving radio base station and the at least one other radio base station to control at least one of the serving radio base station and the at least one other radio base station to transmit at least one transmit power control command to the user equipment to trigger an adjustment of a transmit power of the uplink control channel.

2. The method according to claim 1, further comprising determining a difference in transmit power between the serving radio base station and the at least one other radio base station, wherein:
   generating the updated power quality target comprises:
      generating a first updated power quality target based on the quality representation; and
      generating a second updated power quality target based on the first updated power quality target and the difference in transmit power; and
   transmitting the updated power quality target comprises:
      transmitting one of the first updated power quality target and the second updated power quality target to the serving radio base station; and
      transmitting the other of the first updated power quality target and the second updated power quality target to the at least one other radio base station.

3. The method according to claim 1, further comprising comparing the quality representation to a threshold value, wherein generating the updated power quality target comprises generating the updated power quality target based on the comparison of the quality representation to the threshold value.

4. The method according to claim 1, wherein providing the quality representation comprises:
   determining an uplink asymmetry between the serving radio base station and the at least one other radio base station; and
   generating the quality representation based on the determined uplink asymmetry.

5. The method according to claim 4, wherein determining the uplink asymmetry comprises determining the uplink asymmetry based on a determination of a fraction of packets received on an enhanced uplink channel from the serving radio base station.

6. The method according to claim 1, wherein providing the quality representation comprises receiving a quality report from the serving radio base station.

7. The method according to claim 6, wherein receiving the quality report comprises receiving the quality report generated by the serving radio base station based on measurements of a power quality on the reference control channel.

8. The method according to claim 1, wherein providing the quality representation comprises receiving the quality representation from the user equipment.

9. The method according to claim 8, wherein receiving the quality representation comprises receiving the quality representation generated by the user equipment based on a monitoring of transmit power control commands transmitted from the serving radio base station to the user equipment.

10. A power control method in a communication network when a user equipment is in communication with a serving radio base station and at least one other radio base station over a radio interface on uplink channels, and the serving radio base station is connected to a radio network controller configured to implement the power control method, the method comprising:
   providing a quality representation of an uplink control channel from the user equipment to the serving radio base station;
   generating an updated power offset for the uplink control channel relative to a reference control channel based on the quality representation; and
   transmitting the updated power offset to the user equipment to trigger an adjustment of a transmit power of the uplink control channel based on the updated power offset and a transmit power of the reference control channel.

11. The method according to claim 10, further comprising comparing the quality representation to a threshold value, wherein generating the updated power offset comprises generating the updated power offset based on the comparison of the quality representation to the threshold value.

12. The method according to claim 10, wherein providing the quality representation comprises:
   determining an uplink asymmetry between the serving radio base station and the at least one other radio base station; and
   generating the quality representation based on the determined uplink asymmetry.

13. The method according to claim 12, wherein determining the uplink asymmetry comprises determining the uplink asymmetry based on a determination of a fraction of packets received on an enhanced uplink channel from the serving radio base station.

14. The method according to claim 10, wherein providing the quality representation comprises receiving a quality report from the serving radio base station.

15. The method according to claim 14, wherein receiving the quality report comprises receiving the quality report generated by the serving radio base station based on measurements of a power quality on the reference control channel.

16. The method according to claim 10, wherein providing the quality representation comprises receiving the quality representation from the user equipment.

17. The method according to claim 16, wherein receiving the quality representation comprises receiving the quality representation generated by the user equipment based on a monitoring of transmit power control commands transmitted from the serving radio base station to the user equipment.

18. A power control device configured to be implemented in a radio network controller in a communication network when a user equipment is in communication with a serving radio base station and at least one other radio base station over a radio interface on uplink channels, the serving radio base station being connected to the radio network controller, wherein the power control device comprises:
   a representation provider configured to provide a quality representation of an uplink control channel from the user equipment to the serving radio base station;
   a power quality target generator configured to generate an updated power quality target for a reference control channel based on the quality representation; and
   a transmitter configured to transmit the updated power quality target to at least one of the serving radio base station and the at least one other radio base station to control at least one of the serving radio base station and the at least one other radio base station to transmit at least one transmit power control command to the user equipment to trigger an adjustment of a transmit power of the uplink control channel.

19. The power control device according to claim 18, further comprising a power determiner configured to determine a difference in transmit power between the serving radio base station and the at least one other radio base station, wherein
   the power quality target generator generate the updated power quality target by:
      generating a first updated power quality target based on the quality representation; and
      generating a second updated power quality target based on the first updated power quality target and the difference in transmit power; and
   the transmitter transmits the updated power quality target by:
      transmitting one of the first updated power quality target and the second updated power quality target to the serving radio base station; and
      transmitting the other of the first updated power quality target and the second updated power quality target to the at least one other radio base station.

20. The power control device according to claim 18, further comprising a comparator configured to compare the quality representation to a threshold value, wherein the power quality target generator is configured to generate the updated power quality target based on the comparison of the quality representation to the threshold value.

21. The power control device according to claim 18, wherein the representation provider comprises:
   an uplink asymmetry determiner configured to determine an uplink asymmetry between the serving radio base station and the at least one other radio base station; and
   a representation generator configured to generate the quality representation based on the uplink asymmetry determined by the uplink asymmetry determiner.

22. The power control device according to claim 21, wherein the uplink asymmetry determiner is configured to determine a fraction of packets received from the serving radio base station on an enhanced uplink channel as a representation of the uplink asymmetry.

23. The power control device according to claim 18, wherein the representation provider comprises:
   a quality estimator configured to determine multiple quality estimates for the uplink control channel at different time instances; and
   a calculator configured to calculate the quality representation based on an average of the multiple quality estimates.

24. The power control device according to claim 18, wherein the representation provider comprises:
   a quality estimator configured to determine multiple quality estimates for the uplink control channel at different time instances; and
   a selector configured to select a maximum quality estimate among the multiple quality estimates as the quality representation.

25. The power control device according to claim 18, wherein the representation provider comprises a representation receiver configured to receive a quality report from the serving radio base station.

26. The power control device according to claim 25, wherein the representation receiver is configured to receive the quality report generated by the serving radio base station based on measurements of a power quality on the reference control channel.

27. The power control device according to claim 18, wherein the representation provider comprises a representation receiver configured to receive the quality representation from the user equipment.

28. The power control device according to claim 27, wherein the representation receiver is configured to receive the quality representation generated by the user equipment based on a monitoring of transmit power control commands transmitted from the serving radio base station to the user equipment.

29. A power control device configured to be implemented in a radio network controller in a communication network when a user equipment is in communication with a serving radio base station and at least one other radio base station over a radio interface on uplink channels, the serving radio base station being connected to the radio network controller, wherein the power control device comprises:
   a representation provider configured to provide a quality representation of an uplink control channel from the user equipment to the serving radio base station;
   a power offset generator configured to generate an updated power offset for the uplink control channel relative a reference control channel based on the quality representation; and
   a transmitter configured to transmit the updated power offset to the user equipment to trigger an adjustment of a transmit power of the uplink control channel based on the updated power offset and a transmit power of the reference control channel.

30. The power control device according to claim 29, further comprising a comparator configured to compare the quality representation to a threshold value, wherein the power offset generator is configured to generate the updated power offset based on the comparison of the quality representation to the threshold value.

31. The power control device according to claim 29, wherein the representation provider comprises:
   an uplink asymmetry determiner configured to determine an uplink asymmetry between the serving radio base station and the at least one other radio base station; and a representation generator configured to generate the quality representation based on the uplink asymmetry determined by the uplink asymmetry determiner.

32. The power control device according to claim 31, wherein the uplink asymmetry determiner is configured to determine a fraction of packets received from the serving radio base station on an enhanced uplink channel as a representation of the uplink asymmetry.

33. The power control device according to claim 29, wherein the representation provider comprises:
 a quality estimator configured to determine multiple quality estimates for the uplink control channel at different time instances; and
 a calculator configured to calculate the quality representation based on an average of the multiple quality estimates.

34. The power control device according to claim 29, wherein the representation provider comprises:
 a quality estimator configured to determine multiple quality estimates for the uplink control channel at different time instances; and
 a selector configured to select a maximum quality estimate among the multiple quality estimates as the quality representation.

35. The power control device according to claim 29, wherein the representation provider comprises a representation receiver configured to receive a quality report from the serving radio base station.

36. The power control device according to claim 35, wherein the representation receiver is configured to receive the quality report generated by the serving radio base station based on measurements of a power quality on the reference control channel.

37. The power control device according to claim 29, wherein the representation provider comprises a representation receiver configured to receive the quality representation from the user equipment.

38. The power control device according to claim 37, wherein the representation receiver is configured to receive the quality representation generated by the user equipment based on a monitoring of transmit power control commands transmitted from the serving radio base station to the user equipment.

* * * * *

UNITED STATES PATENT AND TRADEMARK OFFICE
CERTIFICATE OF CORRECTION

PATENT NO. : 8,855,700 B2
APPLICATION NO. : 13/266007
DATED : October 7, 2014
INVENTOR(S) : Blomgren et al.

It is certified that error appears in the above-identified patent and that said Letters Patent is hereby corrected as shown below:

In the specification

Column 5, Line 21, delete "$PC_{PICH}$," and insert -- $P_{CPICH}$, --, therefor.

Column 5, Line 59, delete "$E_c/I_0$" and insert -- $E_C/I_o$ --, therefor.

Column 20, Line 36, delete "(I/0)" and insert -- (I/O) --, therefor.

Signed and Sealed this
Twenty-third Day of February, 2016

Michelle K. Lee
*Director of the United States Patent and Trademark Office*